US012362984B1

(12) United States Patent
Mitreuter et al.

(10) Patent No.: US 12,362,984 B1
(45) Date of Patent: Jul. 15, 2025

(54) SYSTEM AND METHOD FOR SHARING UPDATES BETWEEN REPOSITORIES IN ENTERPRISE CONTENT MANAGEMENT

(71) Applicant: Veeva Systems Inc., Pleasanton, CA (US)

(72) Inventors: Scott Edward Mitreuter, Brick, NJ (US); Andrew Han, Needham, MA (US); Bobby Ng, Danville, CA (US); Katharyn A. Wilber, Boston, MA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/950,611

(22) Filed: Nov. 18, 2024

Related U.S. Application Data

(63) Continuation of application No. 16/751,205, filed on Jan. 23, 2020, now Pat. No. 12,192,044.

(51) Int. Cl.
| | | |
|---|---|---|
| *H04L 41/02* | (2022.01) | |
| *G06F 16/25* | (2019.01) | |
| *H04L 41/0806* | (2022.01) | |
| *H04L 41/5003* | (2022.01) | |
| *H04L 43/06* | (2022.01) | |

(52) U.S. Cl.
CPC .............. *H04L 41/02* (2013.01); *G06F 16/25* (2019.01); *H04L 41/0806* (2013.01); *H04L 41/5003* (2013.01); *H04L 43/06* (2013.01)

(58) Field of Classification Search
CPC . H04L 41/02; H04L 41/0806; H04L 41/5003; H04L 43/06; G06F 16/25
See application file for complete search history.

(56) References Cited

U.S. PATENT DOCUMENTS

| | | |
|---|---|---|
| 6,523,027 B1 | 2/2003 | Underwood |
| 6,678,355 B2 | 1/2004 | Eringis et al. |
| 6,904,370 B1 | 6/2005 | Levinson et al. |
| 7,054,823 B1 * | 5/2006 | Briegs .................. G16H 10/20 |
| | | 707/999.001 |
| 8,355,926 B1 | 1/2013 | Hinz et al. |
| (Continued) | | |

FOREIGN PATENT DOCUMENTS

| | | |
|---|---|---|
| WO | 0180092 A2 | 10/2001 |
| WO | 2019231917 A1 | 12/2019 |

*Primary Examiner* — Nicholas R Taylor
*Assistant Examiner* — Angela Widhalm De Rodriguez

(57) ABSTRACT

Systems and methods for sharing updates in two repositories in a content management system. The method includes receiving integration point configuration information for integrating the first repository and the second repository. The method further includes creating a first record in the first repository for a first change and generating a plurality of impact assessments in the first repository for the first change. The method further includes assigning one impact assessment of the plurality of impact assessments to the second repository. The assigned one impact assessment identifies a medical product associated with the first change. The method includes generating a second record. The second record includes a link to the one impact assessment. The method further includes providing the impact assessment of the first repository to the user account of the second group of multiple user accounts associated with the second repository.

20 Claims, 15 Drawing Sheets

(56) References Cited

U.S. PATENT DOCUMENTS

| | | | |
|---|---|---|---|
| 9,026,652 | B1 | 5/2015 | Piehler et al. |
| 9,367,626 | B2 | 6/2016 | Pappas |
| 9,529,851 | B1 | 12/2016 | Smith |
| 10,445,170 | B1 | 10/2019 | Subramanian et al. |
| 10,678,866 | B1 | 6/2020 | Ranganathan et al. |
| 10,810,055 | B1 | 10/2020 | Walker |
| 2001/0056422 | A1 | 12/2001 | Benedict et al. |
| 2002/0198752 | A1 | 12/2002 | Stiffler |
| 2003/0139983 | A1 | 7/2003 | Spencer et al. |
| 2005/0060417 | A1 | 3/2005 | Rose |
| 2006/0106825 | A1 | 5/2006 | Cozzi |
| 2007/0271299 | A1 | 11/2007 | Wang et al. |
| 2008/0127310 | A1 | 5/2008 | Robbins et al. |
| 2009/0182750 | A1 | 7/2009 | Keyes et al. |
| 2009/0271243 | A1 | 10/2009 | Sholl et al. |
| 2010/0318559 | A1 | 12/2010 | Yan et al. |
| 2011/0224953 | A1 | 9/2011 | Webster et al. |
| 2012/0089418 | A1 | 4/2012 | Kamath et al. |
| 2012/0179276 | A1 | 7/2012 | Kolenc et al. |
| 2017/0068718 | A1 | 3/2017 | Schaffer |
| 2019/0066241 | A1 | 2/2019 | Budlong |
| 2019/0129991 | A1 | 5/2019 | Auer et al. |
| 2020/0125541 | A1 | 4/2020 | Apps et al. |
| 2021/0014282 | A1 | 1/2021 | Anctil et al. |
| 2021/0132962 | A1 | 5/2021 | Makhija et al. |
| 2021/0133186 | A1 | 5/2021 | Jalali et al. |
| 2021/0209549 | A1* | 7/2021 | Bornstein ............... G06Q 10/08 |

\* cited by examiner

Change Control Impact Assessment: IA-000002 ☆ [OPEN]

▶ Workflow Timeline

▼ Details

Record ID*  IA-000002

Title*  Reg Assessment of MFG Site Change for Vodavir

Impact Assessment Type*  Regulatory Impact Assessment ▾

Assessment Due Date  7/31/2019

Assessment Owner  Uri

Department  Regulatory

Impact

Justification for Assessment

Assessment Summary

FIG. 9B

Manufacturing Event: Add Vodavir Salt Manufacturer ☆ [IN PROGRESS]

▼ Details

| | | | |
|---|---|---|---|
| Name | Add Vodavir Salt Manufacturer | Event Status | In Progress |
| Status | Active | Event Type | Manufacturing Event |
| Impacted Product | XXX | Baseline Content Plan | Vodavir Baseline XXX XXX XXX XXX XXX XXX XXX |
| Planned Completion Date | XXX | Change Control Description | Due to issues with our existing Manufacturing sites for Vodavir, we are adding a new approved MFG Site for Vodavir. |
| Planned Start Date | | Regulatory Risk Assessment | Manufacturing Event |
| Related Change Control Number | XXX | Regulatory Risk Assessment Justification | Only markets with impact are Belgium, Canada, XXX and the US |
| Lifecycle | XXX | | |

▼ Activities

+ Create   🔍 Show: XXX                                                                                         1-5 of 5 ⚙ ▶

| Name ▲ | Impacted Market | Impacted Product | Impacted Product Detail | Related Application | Related Submission |
|---|---|---|---|---|---|
| XXX | XXX | XXX | | XXX | Add Vodavir Salt Manu |
| XXX | XXX | XXX | | XXX | XXX Add Vodavir Salt |
| XXX | XXX | XXX | | XXX | Add Vodavir Salt Manu |
| XXX | XXX | XXX | | XXX | Add Vodavir Salt Manu |

FIG. 9C

Impact Assessment Report — XXX XXX XXX Substance

Report Type XXX Assessment, Active Substance
- FILTERS (2)
- Expand XXX ▸ XXX ▸

Registration (10)

| Name | Drug Product | Product Detail | Application | Registered Active Substance (14) | | | | |
|---|---|---|---|---|---|---|---|---|
| | Country | | | Name | Active Substance | Manufacturer Name | Lifecycle State | Application | Regulatory Objective |

▾ Country: Belgium (1)

▾ Registration Status: Approved (1)

| XX Vodavir 15mg | Belgium | Vodavir 15mg | BE H/02345/DC | BE Vodavir 15mg, Vodavir Salt F-Six | Vodavir Salt | F-Six | Approved | BE H/02345/DC | Initial Filing |
| | | | | BE Vodavir 15mg, Vodavir Salt A-One | Vodavir Salt | A-One | Approved | BE H/02345/DC | Initial Filing |

▾ Country: Canada (2)

▾ Registration Status: Approved (2)

| XX Vodavir 30mg | Canada | Vodavir 30mg | NDS 002916 | CA Vodavir 30mg, Vodavir Salt A-One | Vodavir Salt | A-One | Approved | NDS 002916 | Initial Filing - Vodavir Market Entry - US.M Y/CA |
| XX Vodavir 15mg | Canada | Vodavir 15mg | NDS 002916 | CA Vodavir 15mg, Vodavir Salt A-One | Vodavir Salt | A-One | Approved | NDS 002916 | Initial Filing - Vodavir Market Entry - US.M Y/CA |

▾ Country: Denmark (1)

▾ Registration Status: Approved (1)

| XX Vodavir 15mg | Denmark | Vodavir 15mg | BE H/02345/DC | DK Vodavir 15mg, Vodavir Salt F-Six | Vodavir Salt | F-Six | Approved | BE H/02345/DC | Initial Filing |

FIG. 9D

▼ Change Actions

+ Create     🔍 Show: XXX     1-1 of 1 ⚙ ▶

| Name ▲ | Title | Lifecycle State |
|---|---|---|
| A XXXXX | MFG Change to Use Material from new Site Source | XXX |
| A XXXXX | Update XXX to XXX MFG Site | XXX |
| A XXXXX | Regulatory Filing Actions | XXX |

FIG. 9E

SYSTEM AND METHOD FOR SHARING UPDATES BETWEEN REPOSITORIES IN ENTERPRISE CONTENT MANAGEMENT

CROSS REFERENCE TO RELATED APPLICATIONS

This application is a Continuation of U.S. patent application Ser. No. 16/751,205, filed Jan. 23, 2020, which is incorporated herein by reference in its entirety.

BACKGROUND

The subject technology relates generally to content management, and more particularly to sharing updates among repositories in enterprise content management.

Users increasingly depend on content management systems because of their ubiquitous and managed access, from anywhere, at any time, from any device. However, previous content management systems do not support sharing updates across repositories. Users of a first repository, who usually belong to a first business group, have to frequently ask for updates from users of a second repository, who usually belong to a second business group, and then manually update the first repository. The process is time consuming, inconvenient and error-prone.

Thus, it is desirable to enable update sharing among repositories in enterprise content management to support seamless cross-repository business processes and allow users to have visibility on updates in related repositories.

SUMMARY

The disclosed subject matter relates to a method for sharing updates between a first repository and a second repository in a content management system, wherein the content management system comprises a content management server. The method Includes receiving integration point configuration information for integrating the first repository and the second repository. The first repository is associated with a first group of multiple user accounts and a first application. The second repository is associated with a second group of multiple user accounts and a second application. The method further includes creating a first record in the first repository for a first change and generating a plurality of impact assessments in the first repository for the first change. The method further includes assigning one impact assessment of the plurality of impact assessments to the second repository. The assigned one impact assessment relates to the second repository and identifies a medical product associated with the first change. The method includes generating a second record for the impact assessment relating to the second repository in the first repository. The second record for the impact assessment relating to the second repository comprises a link to the one impact assessment. The method further includes sending the second record from the first repository to the second repository via a first integration point message. The method further includes providing, in response to a selection of the link by a user account of the second group of multiple user accounts, the impact assessment of the first repository to the user account of the second group of multiple user accounts associated with the second repository.

The disclosed subject matter further relates to a method for sharing updates between a first repository and a second repository in a content management system, wherein the content management system comprises a content management server. The method Includes receiving integration point configuration information for integrating the first repository and the second repository. The first repository is associated with a first group of multiple user accounts and a first application. The second repository is associated with a second group of multiple user accounts and a second application. The method further includes creating a first record in the first repository for a first change and generating a plurality of impact assessments in the first repository for the first change. The method further includes assigning one impact assessment of the plurality of impact assessments to the second repository. The assigned one impact assessment relates to the second repository and identifies a country associated with the first change. The method includes generating a second record for the impact assessment relating to the second repository in the first repository. The second record for the impact assessment relating to the second repository comprises a link to the one impact assessment. The method further includes sending the second record from the first repository to the second repository via a first integration point message. The method further includes providing, in response to a selection of the link by a user account of the second group of multiple user accounts, the impact assessment of the first repository to the user account of the second group of multiple user accounts associated with the second repository.

BRIEF DESCRIPTION OF THE DRAWINGS

FIGS. 9A-9E illustrate example updates shared between two repositories in an enterprise content management system according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
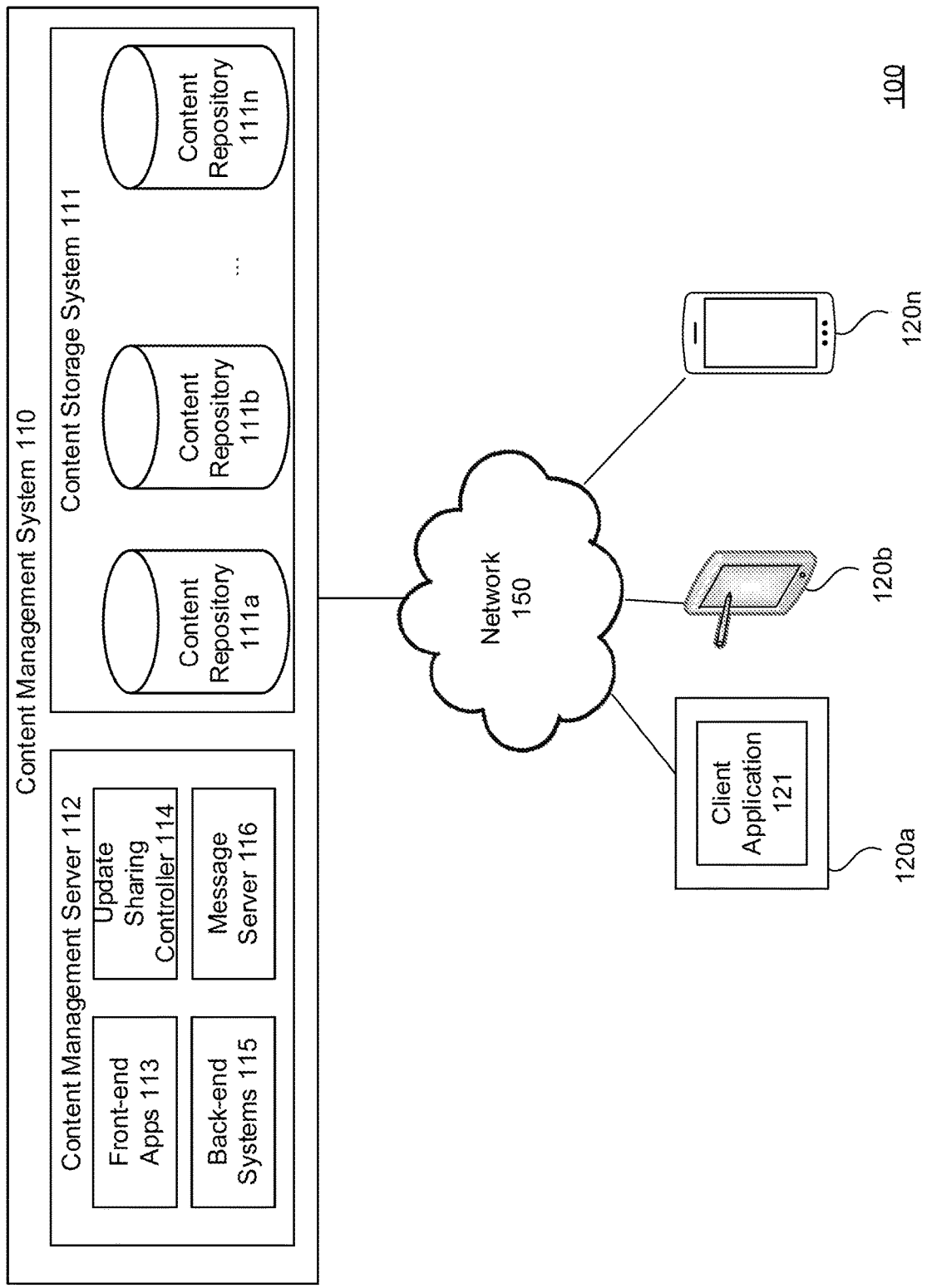
FIG. 1 illustrates an example high level block diagram of an enterprise content management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, . . . 120n, coupled to each other via a network 150. The content management system 110 may include a content storage system 111 and a content management server 112. The content storage system 111 may have two or more content repositories, e.g., 111a, 111b, . . . and 111n. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access content in the content management system 110 via the network 150. User computing devices 120a-120n are illustrated in more detail in FIG. 4.

The content storage system 111 may store content that client applications (e.g., 121) in user computing devices 120a-120n may access and may be any commercially available storage devices. As will be described with reference to FIG. 2 below, each content repository (e.g., 111a, 111b or 111n) may store a specific category of content, be the source repository for its content, and allow users to interact with its content in a specific business context. Updates in a first repository (e.g., 111a) may be automatically shared with a second repository (e.g., 111b), and vice versa, so that users of the first repository may have visibility on updates in the second repository and users of the second repository may have visibility on updates in the first repository.

The content management server 112 is typically a remote computer system accessible over a remote or local network, such as the network 150. The content management server 112 could be any commercially available computing devices. A client application (e.g., 121) process may be active on one or more user computing devices 120a-120n. The corresponding server process may be active on the content management server 112, as one of the front-end applications 113 described with reference to FIG. 2. The client application process and the corresponding server process may communicate with each other over the network 150, thus providing distributed functionality and allowing multiple client applications to take advantage of the information-gathering capabilities of the content management system 110.

The content management server 112 may include an update sharing controller 114 which may control the process for sharing updates among repositories, as will be described with reference to FIG. 8 below.

The content management server 112 may include a message server 116 which may control the process for sending messages between repositories, as will be described with reference to FIG. 10 below.

Although the front-end applications 113, back-end systems 115, the update sharing controller 114 and the message server 116 are shown in one server, it should be understood that they may be implemented in multiple computing devices.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
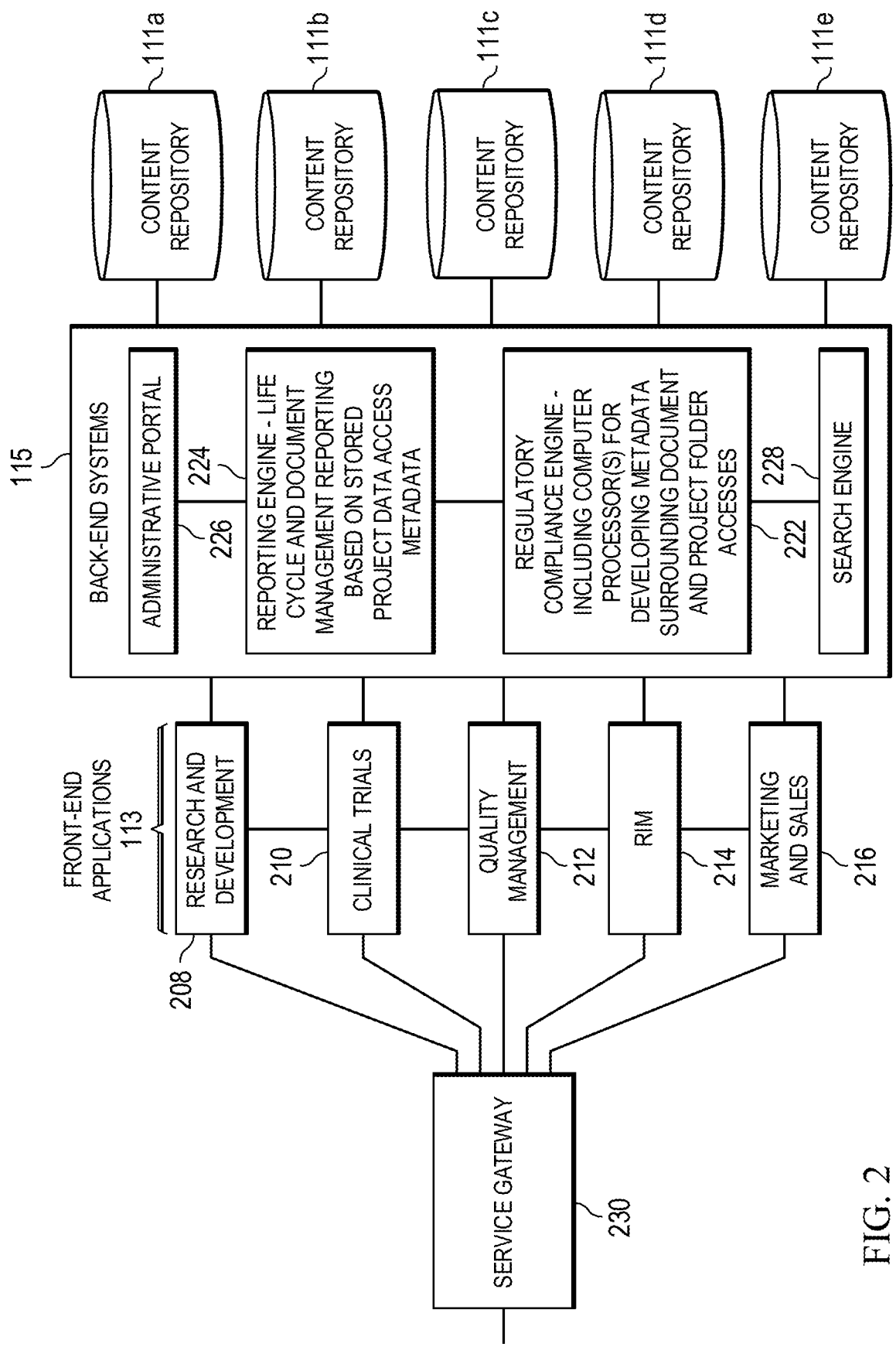
FIG. 2 provides a description of the content management system with additional specific applications and interfaces connected thereto.

FIG. 2 provides a description of the content storage system 111 with additional specific applications and interfaces connected thereto. In an embodiment, this content storage system 111 is a cloud-based or distributed network based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in the figure, this content storage system 111 can include specific data collections for the following areas and/or business process-specific front-end applications 113:

A Research & Development (R&D) front-end application 208 provides for an aggregation of materials in support of research and initial clinical trial submissions through building organized and controlled content repositories within the content management system 110, more specifically, the content repository 111a. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

A clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111*b*, between this phase and other phases of the life sciences development process.

A manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the content management system 110, or more specifically, the content repository 111*c*, whereby it can be assured that the related documents are not distributed in contravention of law and company policy. The application 212 also manages business processes including change control, complaints, corrective actions and preventive actions ("CAPA"), deviation and audits.

A regulatory information management ("RIM") application 214 provides for management of regulatory information, submission processes and submission reports, which may include, e.g., safety reporting, product registrations, health authority interactions, central and local requirements, submissions to health authorities, and health authority information management. The product registration information may include, e.g., the associated product information, application information, application date, registration details, key registration dates, marketing status, and marketing details. The health authority interactions may include bidirectional interactions with health authorities globally, including correspondences, commitments and queries. Pharmaceutical companies may submit registration applications to health authorities to get approval for selling products in a country. The registration process may take a few months and status of the registration may change over time. User may see global registrations and their status in one or more submission reports. Related documents may be stored in the content repository 111*d*.

A marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111*e*.

The content management system 110 may have a number of back-end system applications 115 that provide for the management of the data, forms, and other communications in. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

The back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

The back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

The back-end systems 115 may include a search engine 228 whereby the content management system 110 can deliver simple, relevant and secure searching.

The content management system 110 may have more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back end systems 115, enabling seamless integration among complementary systems.

In the context of the described embodiments, updates in one repository, e.g., the content repository 111*c* for the quality management application front-end application 212, may be shared with a repository (e.g., the RIM repository 111*d*) for another front-end application (e.g., the RIM application 214).

The content management system 110 may store content for other industries.

Figure 3:
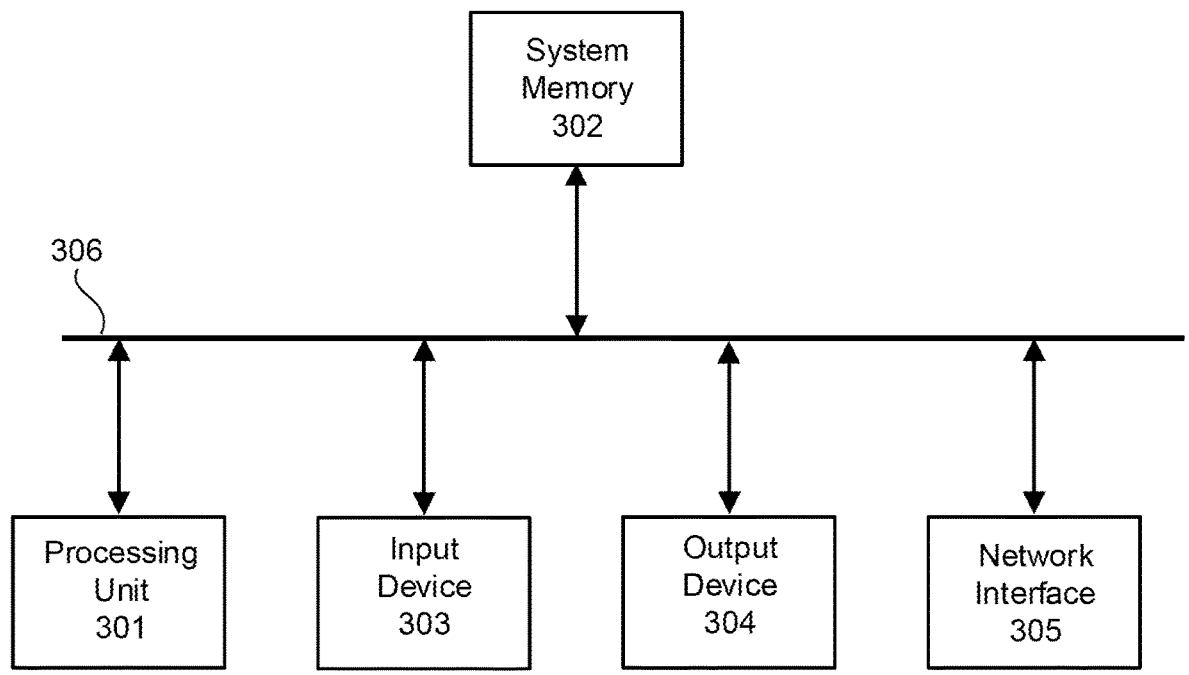
FIG. 3 illustrates an example block diagram of a computing device.

FIG. 3 illustrates an example block diagram of a computing device 300 which can be used as the user computing devices 120*a*-120*n*, and the content management server 112 in FIG. 1. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may be configured to allow the computing device 300 to transmit and receive data in a network, for example, the network 150. The network interface 305 may include one or more network interface cards (NICs).

Figure 4:
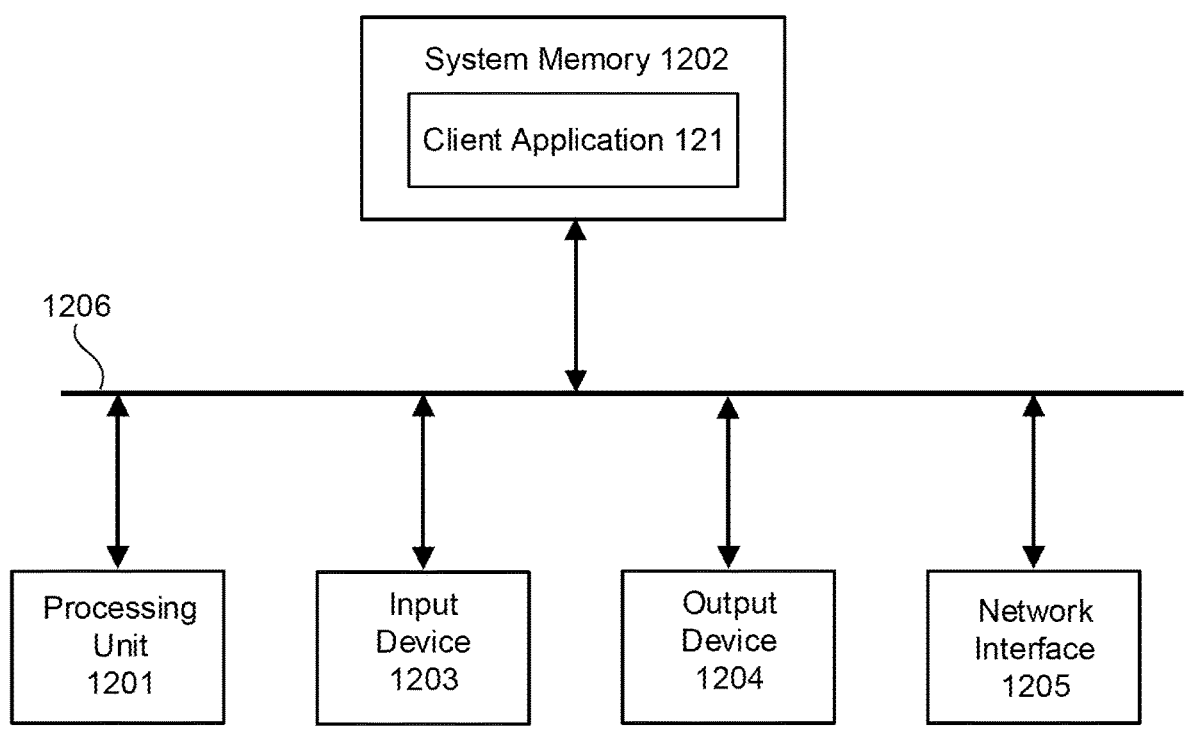
FIG. 4 illustrates an example high level block diagram of a user computing device.

FIG. 4 illustrates an example high level block diagram of a user computing device (e.g., 120a) wherein the present invention may be implemented. The user computing device 120a may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
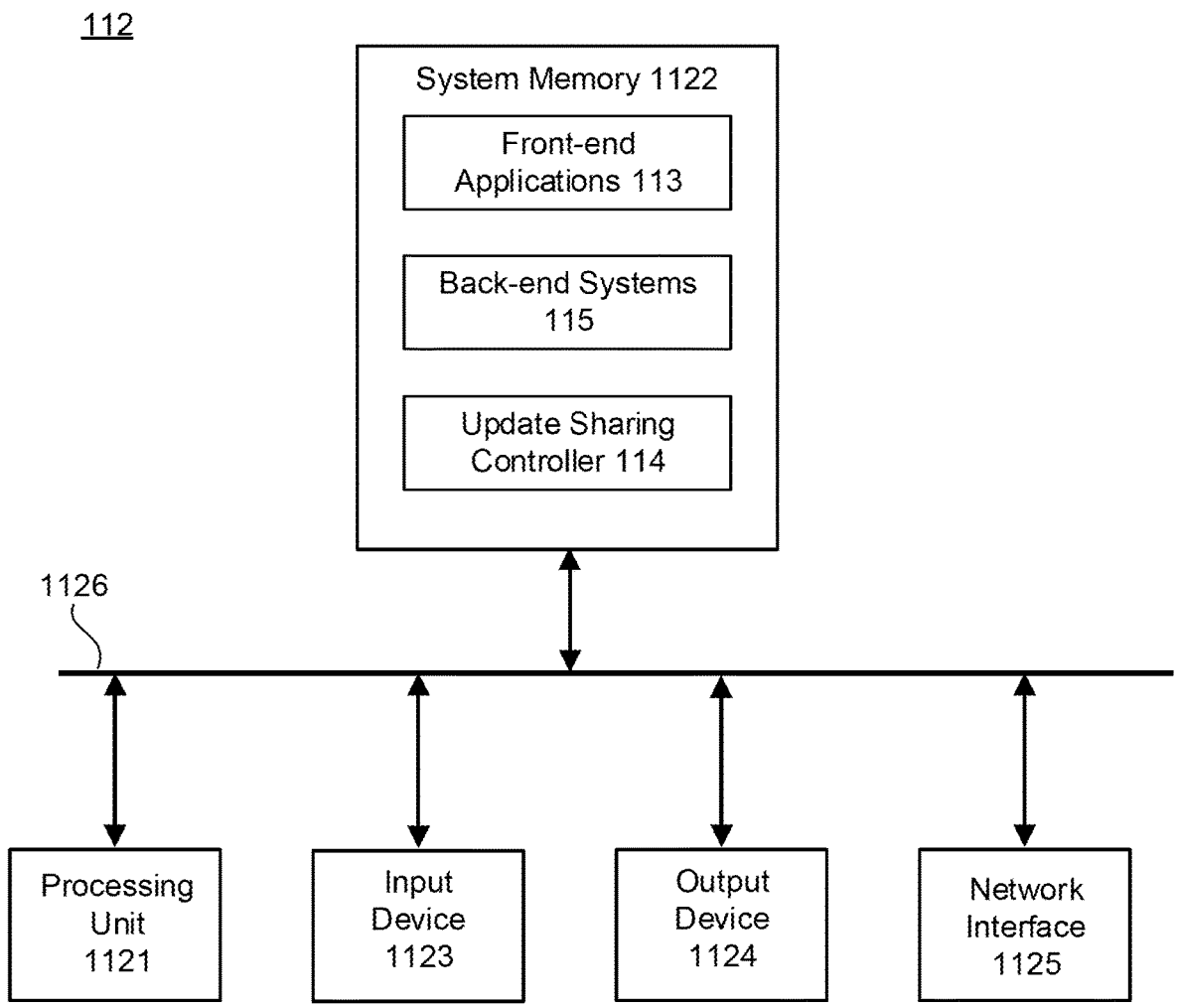
FIG. 5 illustrates an example high level block diagram of the content management server according to one embodiment of the present invention.

FIG. 5 illustrates an example high level block diagram of the content management server 112 according to one embodiment of the present invention. The content management server 112 may be implemented by the computing device 300, and may have a processing unit 1121, a system memory 1122, an input device 1123, an output device 1124, and a network interface 1125, coupled to each other via a system bus 1126. The system memory 1122 may store the front-end applications 113, the back-end systems 115 and the update sharing controller 114.

In one example, change control is managed by a quality management system including the quality management application 212 and the quality management repository 111c, and regulatory is managed by an RIM system including the RIM application 214 and the RIM repository 111d. When users of the quality management system are making some kind of changes, e.g., changing the formula or the ingredients of a drug, changing a part of a process, or getting a new supplier, the change may have impacts beyond what just the quality management team will be executing on. They need to assess the impacts before they can actually start to make the change. The process may include: initiating the change control, assessing the impacts of the change (e.g., what the impacts are, how big the changes are, and things need to be account for to complete that change), reviewing the process for making the change, planning for the steps for executing to complete the change, approving a plan which will give the permission to actually conduct the change, and closing out the change control.

Impacts of the change may include impacts on other teams, e.g., the RIM team, which may require the RIM team to refile these changes in all the markets where they market the product involved. In a prior art system, users on the quality management team may send a description of the change to users on the RIM team, who will create a record in the RIM system, determine the different countries and health authorities to refile their registrations with, and send a summary of the information back to the quality management team. There is a lot of copying and pasting, and users of the systems need to duplicate data in the two different systems without any visibility on what is going on in the other system. The quality management team usually cannot close the change control if there are still open items on the RIM team, e.g., when the new version of the drug is approved in the U.S., but not Australia. Users on the quality management team have to frequently ask those on the RIM team for the updates of the approval status in Australia, and cannot close out the change control until the new version of the drug is approved in all markets.

Figure 6:
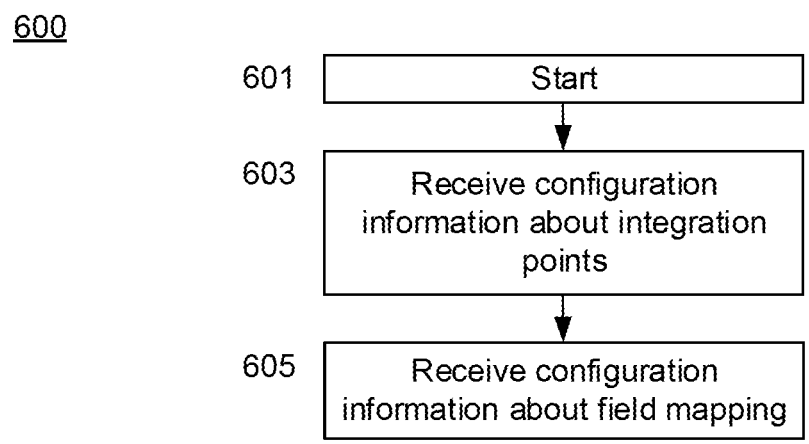
FIG. 6 illustrates a flowchart of a method for configuring the enterprise content management system 100 (as shown in FIG. 1) to share updates across repositories according to one embodiment of the present invention.

FIG. 6 illustrates a flowchart of a method for configuring the enterprise content management system 100 (as shown in FIG. 1) to share updates across repositories according to one embodiment of the present invention.

The process may start at 601.

At 603, configuration information about integration points may be received at the content management server 112, or more specifically, the update sharing controller 114.

Figure 7:
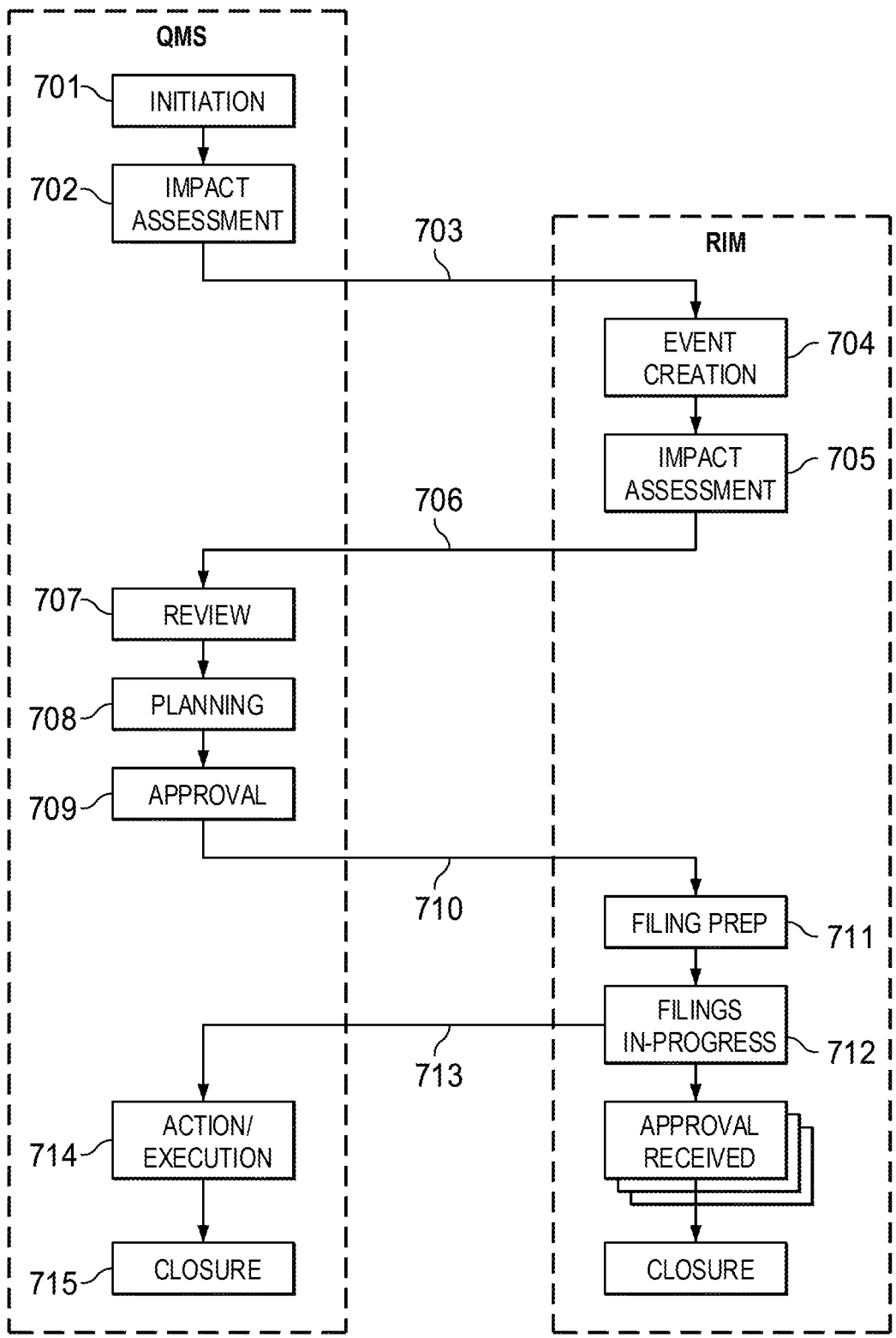
FIG. 7 illustrates example integration points between two repositories in an enterprise content management system according to one embodiment of the present invention.

In one embodiment, a first integration point may be sending a quality control impact assessment record from the quality management system to the RIM system. As shown in FIG. 7, users of the quality management system may initiate a change control process at 701, and work on the impact assessment on the quality management side at 702. At 703, users of the quality management system may send the impact assessment on the quality management side to the RIM system via a first integration point message, so that users of the RIM system can get details of the change control, decide in their own system which of their filings are impacted and need to be refiled, and prepare the impact assessment report on the RIM side.

In one embodiment, a second integration point may send an RIM impact assessment report back to the quality management system. As shown in FIG. 7, in response to the quality control impact assessment record, users of the RIM system create a change control event in the RIM system at 704, and generate an RIM impact assessment report at 705. The second integration point message may send the RIM impact assessment report from the RIM system back to the quality management system at 706.

In one embodiment, a third integration point may be sending an approval from the quality management system to the RIM system. As shown in FIG. 7, users of the quality management system may review the impact assessment report from the RIM side at 707, plan for the change control at 708, and approve the change control plan at 709 so that the quality management team can move forward with change control, and start the actions to complete the change control. At 710, the approved plan may be sent from the quality management system to the RIM system via a third integration point message, so that the RIM system may be updated with the approval to inform users of the RIM system that users of the quality management system have identified the refile activities with the health authorities, and users of the RIM system have the approval to actually send the refiles out.

In one embodiment, a fourth integration point may be sending updates of refile activities from the RIM system to the quality management system. With the approved plan from the quality management system, the RIM team may start to work on the refiles in the RIM system at 711, and submit the refiles at 712. At 713, the RIM system may send updates of the refile activities back to the quality management system via a fourth integration point message, if they are approved, rejected, or partially approved. The quality management system may be updated with the updates of the refile activities from the RIM system. Specifically, the approved impact assessment plan of the quality management system may be updated with the updates of the refile activities from the RIM system. Consequently, users of the quality management system may automatically obtain visibility of the status of the refiles. The quality management system may move forward with the quality management process at 714, and close out the change control at 715 when final decisions of the refiles in impacted countries are received from the RIM system. At the same time, the RIM system may move forward with the RIM process at 716, and close out the refiles at 717 when final decisions of the refiles in impacted countries are received.

At 605, configuration information about field mapping for data in the quality management repository and data in the RIM repository may be received at the content management server 112, or more specifically, the update sharing controller 114. Users of the quality management system and the RIM system may provide a description of which data field in one system should be mapped to a particular data field in the other system, e.g., the product involved, impact, and assessment summary.

Figure 8A:
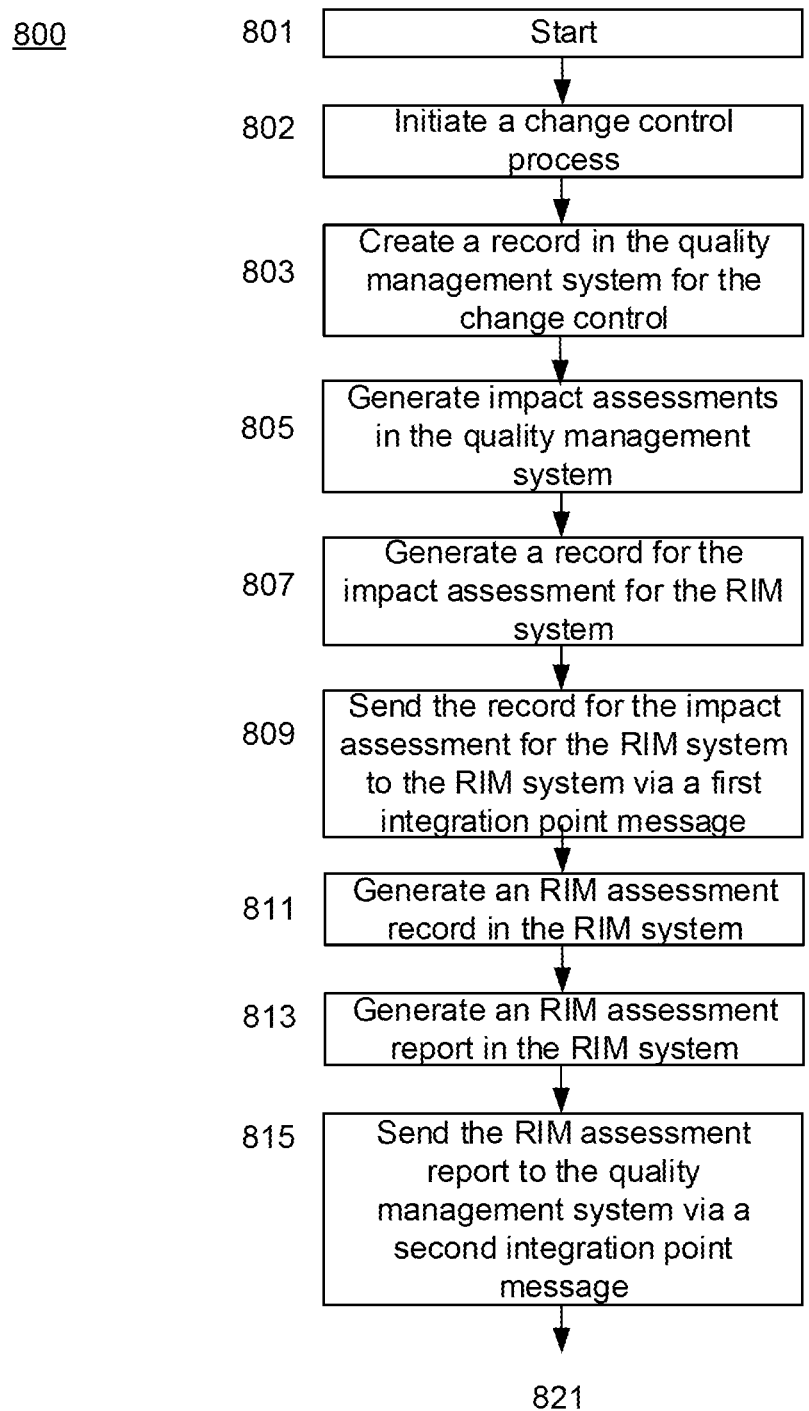
FIGS. 8A and 8B illustrate a flowchart of a method for sharing updates across repositories in an enterprise content management system according to one embodiment of the present invention.
Figure 8B:
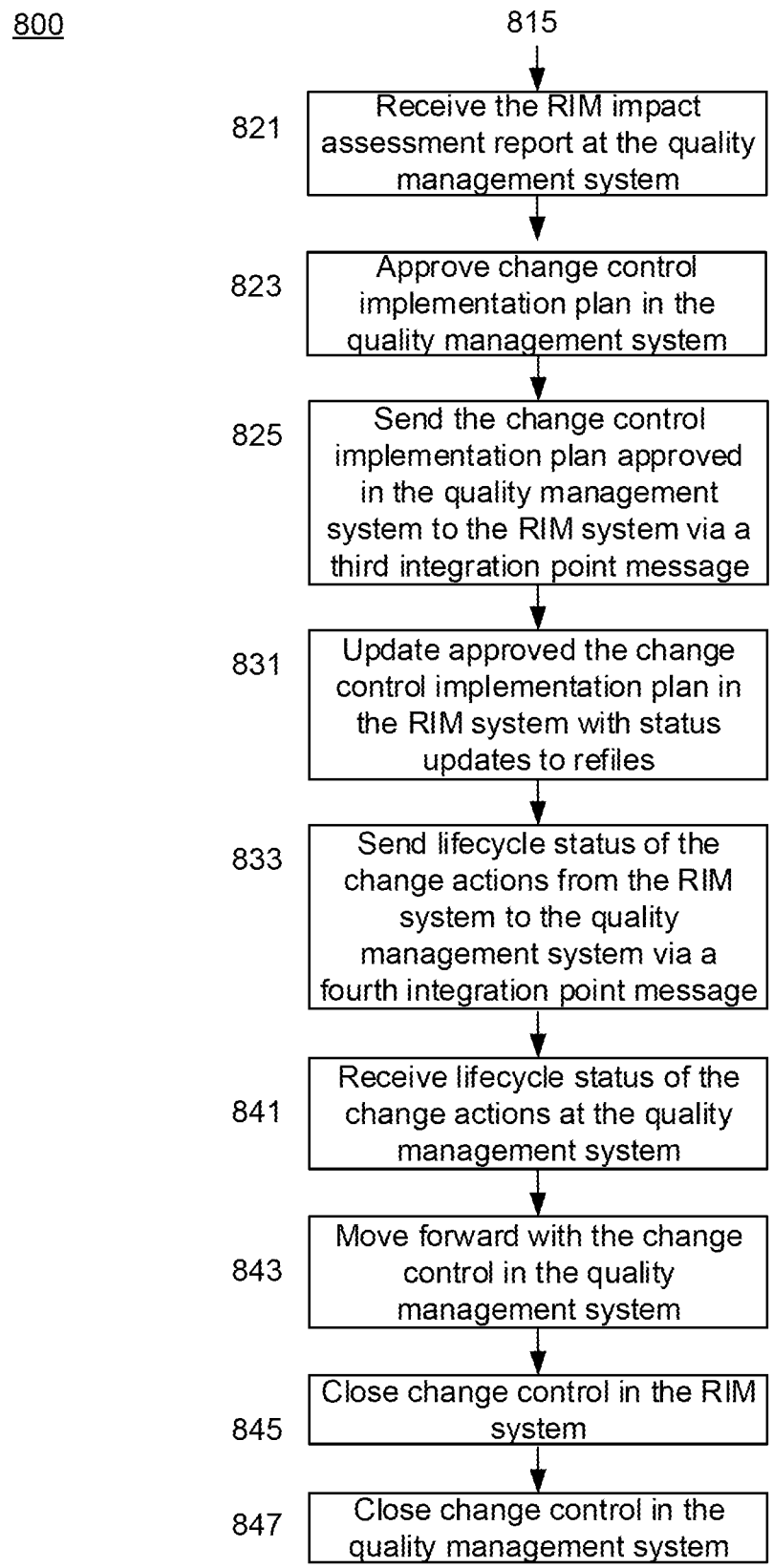

FIGS. 8A and 8B illustrate a flowchart of a method for sharing updates across repositories in the enterprise content management system 100 (as shown in FIG. 1) according to one embodiment of the present invention. The process may start at 801.

At 802, a change control process may be initiated for a first change. A change control form may be filled out, including information about the first change, e.g., a new manufacturing site of a drug.

Figure 9A:

At 803, a record may be created in the quality management repository for the first change. As shown in FIG. 9A, the record may have detailed information about the first change, including its event type, title, description, justification, type, impacted areas, owner, priority and due date.

At 805, a number of impact assessments for the first change may be generated in the quality management repository.

At 807, an impact assessment related to the RIM system may be assigned to the RIM system. A record for the impact assessment related to the RIM system may be automatically generated in the quality management system. As shown in FIG. 9B, the quality management record for the impact assessment related to the RIM system may include its title, impact assessment type, assessment due date, assessment owner, and assessment summary. The quality record for the impact assessment related to the RIM system may have a link back to the quality management system. Through field mapping, data fields in the quality management repository 111c may be shared with the RIM repository 111d, including description of the first change, the product involved, impact, assessment summary, and other fields for exchanging information and updates between the two systems.

At 809, the quality management record for the impact assessment related to the RIM system may be sent from the quality management repository 111c to the RIM repository 111d via a first integration point message. Details of sending the first integration point message will be described in detail with reference to FIG. 10.

At 811, an RIM assessment record may be generated in the RIM repository 111d in response to the quality management record for the impact assessment related to the RIM system from the quality management system. As shown in FIG. 9C, the RIM assessment record may have information about the change control event such as name of the change control event, status, impacted product, planned completion date, planned start date, related change control number, event status, change control description, regulatory risk assessment, and regulatory risk assessment justification.

At 813, an RIM impact assessment report may be generated in the RIM repository 111d. As shown in FIG. 9D, the RIM impact assessment report may include information to be sent back to the quality management repository 111c regarding the actual impacts, such as impacted countries and activities to be performed in each of the impacted countries. The data fields are configurable, and the RIM team may determine the information they want to store and send.

As 815, data in the RIM impact assessment report generated by the RIM system may be sent from the RIM repository 111d back to the quality management repository 111c via a second integration point message. Details of sending the integration point message will be described in detail with reference to FIG. 10.

At 821, the RIM impact assessment report data received from the RIM repository 111d is received at the quality management repository 111c.

Users of the quality management system may review the RIM impact assessment report data, and plan for implementation of the change control. At 823, a change control implementation plan may be approved in the quality management system, so that the quality management team can move forward with change control implementation, and start the actions to complete the change control. One example of the change control implementation plan approved in the quality management system is shown in FIG. 9E.

At 825, the change control implementation plan approved in the quality management system may be sent from the quality management repository 111c to the RIM repository 111d via a third integration point message. Details of sending the integration point message will be described in detail with reference to FIG. 10.

At 831, after receiving the change control implementation plan approved in the quality management system, and the RIM repository 111d may be updated with the approval to inform users of the RIM system that users of the quality management system have identified the refile activities with the health authorities, and users of the RIM system have the approval to actually send the refiles out. Users of the RIM system may start to work on the refile activities, and update the change control implementation plan approved in the quality management system.

At 833, the lifecycle status of the refile activities may be sent from the RIM repository 111d to the quality management repository 111c via a fourth integration point message. Details of sending the integration point message will be described in detail with reference to FIG. 10. Consequently, users of the quality management system have visibility of status of each of the refiles, e.g., pending, in process, completed, and approved, without having to keep asking users of the RIM system about the status of these refiles.

At 841, the lifecycle status of the refile activities from the RIM system may be received at the quality management system, and users of the quality management system may move forward with the quality management process at 843. When final decisions on the refiles are received from health authorities in all impacted markets, users of the RIM system may close their process at 845, and users of the quality management system may close their process at 847.

Figure 10:
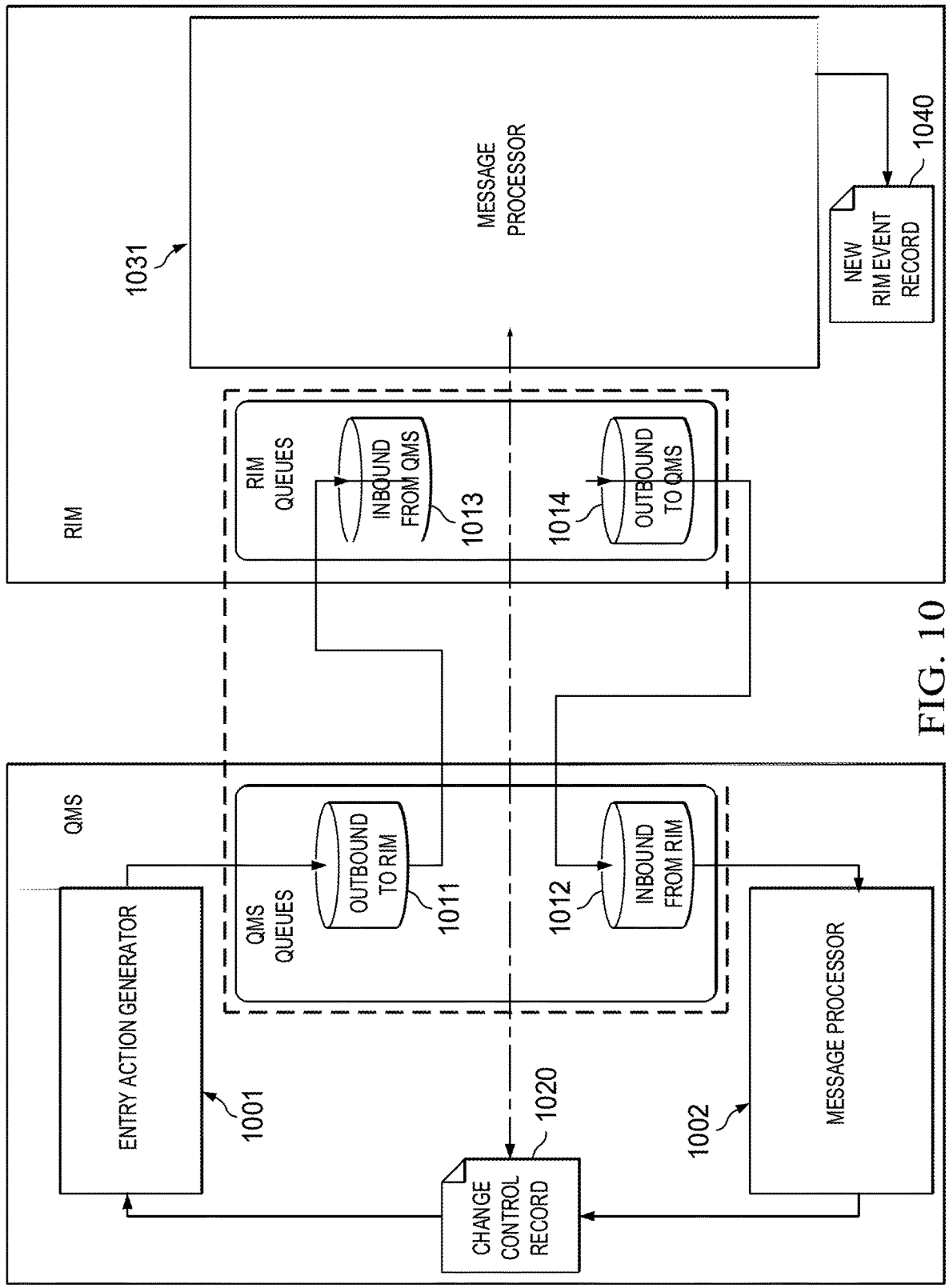
FIG. 10 illustrates an example messaging process for sharing updates across repositories in an enterprise content management system according to one embodiment of the present invention.

FIG. 10 illustrates an example high level block diagram of the architecture for sending updates between two repositories in the content management system according to one embodiment of the present invention. In one embodiment, the two repositories are the quality management repository 111c and the RIM repository 111d. The quality management repository 111*c* may have an entry action generator 1001, and a message processor 1002. The message server 116 may include an outbound queue 1011 for the quality management repository 111*c*, an inbound queue for the quality management repository 111*c*, an inbound queue 1013 for the RIM repository 111*d*, and an outbound queue for the RIM repository 111*d*. The RIM repository 111*d* may include a message processor 1031.

A new change control may be proposed in the quality management repository 111*c*. Since it might have impacts on the RIM repository 111*d*, an impact assessment record 1020 may be created, and assigned to the RIM repository 111*d*. A first integration point message may be generated in the entry action generator 1001, and sent to the outbound queue 1011 of the quality management repository 111*c*. The first integration point message may be, e.g., creating an event in the RIM repository 111*d*.

The message server 116 may deliver the first integration point message to the inbound queue 1013 for the RIM repository 111*d*. The message processor 1031 in the RIM repository 111*d* may process the received first integration point message, and create an event in the RIM repository 111*d* in response. An RIM event record 1040 may be created in the RIM repository 111*d*. To fill out fields on the RIM event record 1040, the message processor 1032 may refer the field mapping table provided by users at 603 in FIG. 6 during the system configuration, call back to the quality management repository 111*c*, pull out the fields needed, and store them on the newly created RIM event record 1040. A confirmation message may be created by the message processor 1031 and sent to the outbound queue 1014 in the RIM repository 111*d*, and then the inbound queue 1012 in the quality management repository 111*c* to confirm successful creation of the event in the RIM repository 111*d* and provide ID of the RIM event record 1040.

The message processor 1001 may receive the confirmation message, and update fields of the impact assessment record 1020 with edits from the RIM repository 111*d*. Thus, each of the quality management repository 111*c* and the RIM repository 111*d* may have a record for the change control, and both records are pointing to each other. Users of both repositories can see that connection, and may click on a link to go to the corresponding record in the other repository.

A similar flow may be used to send other integration point messages. The second integration point message may be, e.g., reviewing an RIM impact assessment report, which may be generated by the message processor 1031, and sent to the inbound queue 1012 of the quality management repository 111*c* via the outbound queue 1014 of the RIM repository 111*d*.

The third integration point message may be, e.g., executing an approved change control implementation plan, which may be generated by the entry action generator 1001, and sent to the inbound queue 1013 of the RIM repository 111*d* via the outbound queue 1011 of the quality management repository 111*c*.

The fourth integration point message may be, e.g., updating the approved change control implementation plan with refile activity lifecycle statuses from the RIM repository 111*d*, which may be generated by the message processor 1031, and sent to the inbound queue 1012 of the quality management repository 111*c* via the outbound queue 1014 of the RIM repository 111*d*.

The present invention automatically sends updates in one repository in the content management system to another and provides users of one repository visibility on another repository, and can help users to avoid delays in the process, duplication of efforts, and errors.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people.

For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for sharing updates between a first repository and a second repository, the method comprising:
   receiving, by a content management server, integration point configuration information for integrating the first repository and the second repository, wherein the first repository is associated with a first group of multiple user accounts and a first application, and wherein the second repository is associated with a second group of multiple user accounts and a second application;
   creating a first record in the first repository for a first change;
   generating a plurality of impact assessments in the first repository for the first change;
   assigning one impact assessment of the plurality of impact assessments to the second repository, wherein the assigned one impact assessment relates to the second repository and identifies a medical product associated with the first change;
   generating a second record for the impact assessment relating to the second repository in the first repository, wherein the second record for the impact assessment relating to the second repository comprises a link to the one impact assessment;
   sending the second record from the first repository to the second repository via a first integration point message; and
   providing, in response to a selection of the link by a user account of the second group of multiple user accounts, the impact assessment of the first repository to the user account of the second group of multiple user accounts associated with the second repository.

2. The method of claim 1, wherein the one impact assessment further identifies a medical product registration associated with the medical product.

3. The method of claim 1, wherein the first application is a quality management application.

4. The method of claim 1, wherein the second application is a regulatory information management ("RIM") application.

5. The method of claim 4, wherein the integration point configuration information comprises configuration information for the first integration point for sending an impact assessment message from the quality management repository to the RIM repository via a second integration point message.

6. The method of claim 5, wherein the integration point configuration information comprises configuration information for a second integration point for sending impact assessment report data from the RIM repository to the quality management repository.

7. The method of claim 6, further comprising: generating an RIM assessment record in the RIM repository in response to the first integration point message, wherein the RIM assessment record comprises information about change control of the first change.

8. The method of claim 7, further comprising: generating an RIM assessment report in the RIM repository, wherein the RIM assessment report comprises information about a first country impacted by the first change.

9. The method of claim 8, further comprising: sending data in the RIM assessment report to the quality management repository via the second integration point message.

10. The method of claim 6, wherein the integration point configuration information comprises configuration information for a third integration point for sending an approved change control implementation plan from the quality management repository to the RIM repository via a third integration point message.

11. The method of claim 10, further comprising: generating a change control implementation plan in the quality management repository in response to the second integration point message, and generating an approved change control implementation plan in the quality management repository.

12. The method of claim 11, further comprising: sending the approved change control implementation plan to the RIM repository via the third integration point message.

13. The method of claim 10, wherein the integration point configuration information comprises a fourth integration point for sending an implementation update to the approved change control implementation plan from the RIM repository to the quality management repository via a fourth integration point message.

14. The method of claim 13, further comprising: updating the approved change control implementation plan with the implementation update in the RIM repository.

15. The method of claim 14, further comprising: sending the implementation update to the approved change control implementation plan to the quality management repository via the fourth integration point message.

16. The method of claim 15, further comprising: closing out a change control process for the first change in the quality management repository in response to the fourth integration point message.

17. The method of claim 1, further comprising: receiving data field mapping configuration information at the content management server for mapping data fields of data in the first repository and data fields of data in the second repository.

18. The method of claim 17, further comprising: mapping data fields of data in the first repository and data fields of data in the second repository.

19. A computer-implemented method for sharing updates between a first repository and a second repository, the method comprising:
receiving, by a content management server, integration point configuration information for integrating the first repository and the second repository, wherein the first repository is associated with a first group of multiple user accounts and a first application, and wherein the second repository is associated with a second group of multiple user accounts and a second application;
creating a first record in the first repository for a first change;
generating a plurality of impact assessments in the first repository for the first change;
assigning one impact assessment of the plurality of impact assessments to the second repository, wherein the assigned one impact assessment relates to the second repository and identifies a country associated with the first change;
generating a second record for the impact assessment relating to the second repository in the first repository, wherein the second record for the impact assessment relating to the second repository comprises a link to the one impact assessment;
sending the second record from the first repository to the second repository via a first integration point message; and
providing, in response to a selection of the link by a user account of the second group of multiple user accounts, the impact assessment of the first repository to the user account of the second group of multiple user accounts associated with the second repository.

20. The method of claim 19, wherein the one impact assessment further identifies a medical product registration associated with the country.

\* \* \* \* \*